Aug. 24, 1937.   E. R. MAURER ET AL   2,091,005
VEHICLE BRAKE APPARATUS
Filed May 1, 1936   2 Sheets-Sheet 1
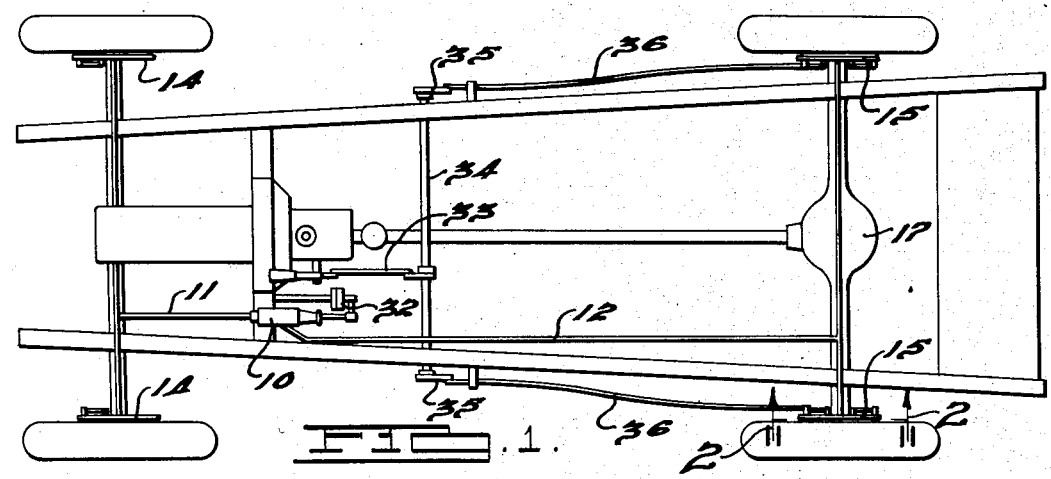
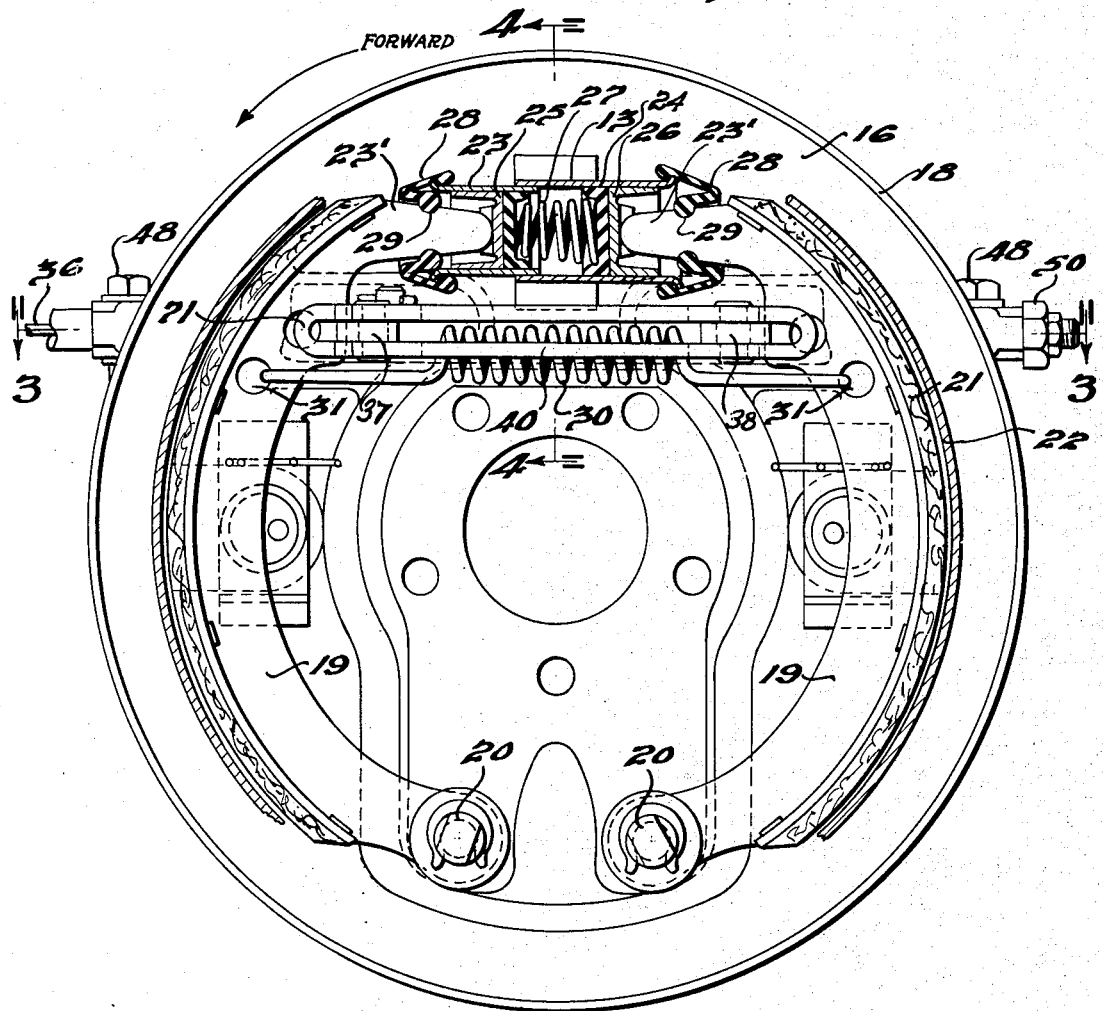
INVENTOR
EDWIN R. MAURER AND
ROBERT SMITH
BY
Harness, Dind, Patie & Harris
ATTORNEYS.

Aug. 24, 1937.    E. R. MAURER ET AL    2,091,005
VEHICLE BRAKE APPARATUS
Filed May 1, 1936    2 Sheets-Sheet 2
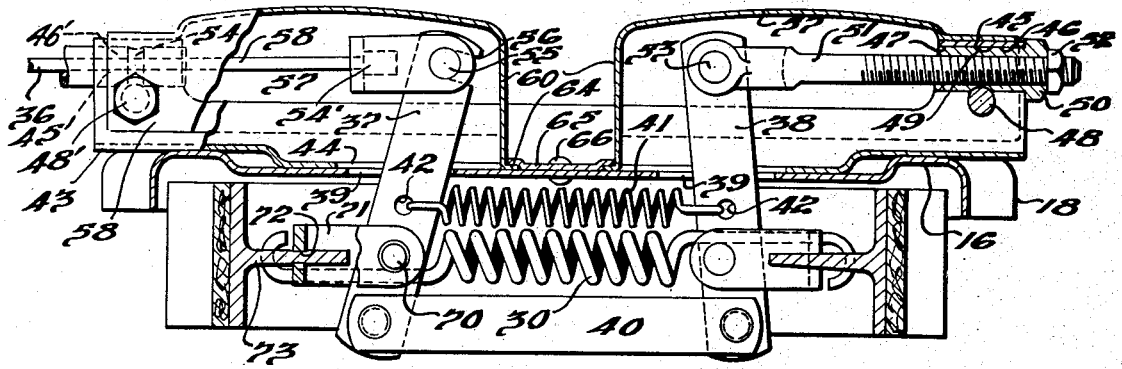
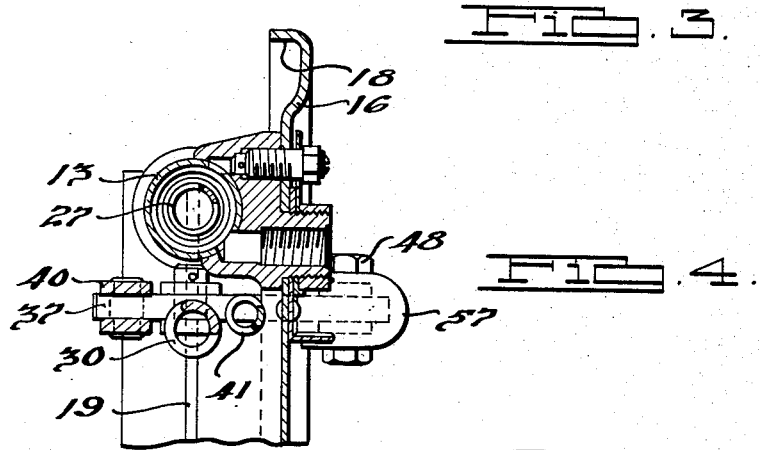
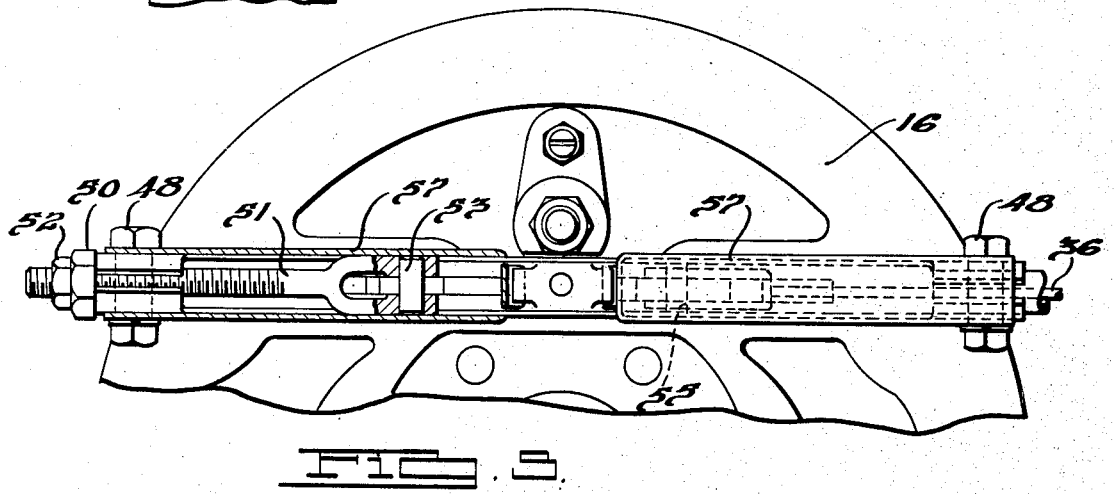
INVENTOR.
EDWIN R. MAURER. AND
ROBERT SMITH
BY
*Harness, Lind, Patee & Harris.*
ATTORNEYS.

Patented Aug. 24, 1937

2,091,005

UNITED STATES PATENT OFFICE 2,091,005

VEHICLE BRAKE APPARATUS

Edwin R. Maurer and Robert Smith, Detroit, Mich., assignors to Chrysler Corporation, Highland Park, Mich., a corporation of Delaware Application May 1, 1936, Serial No. 77,296

10 Claims. (Cl. 188—106)

This invention relates to an improved combined service and emergency brake system for vehicles.

More particularly, the invention pertains to an improved brake system of this kind in which the same brake shoes are operated for service and emergency braking purposes.

One of the main objects of the invention is to provide an improved brake shoe assembly unit which is operable by emergency brake control means and which is adapted to so operate upon the brake shoes of hydraulic, or mechanical, service brake systems as to apply equal pressure thereon.

Another object of the invention is to provide an improved brake shoe applying unit which is universal in application to left, right, front and rear wheels of vehicles.

A further object of the invention is to provide improved means for mounting emergency brake applying apparatus of this kind in a unitary manner on either front or rear wheel brake supports of the right or left sides of a vehicle.

A still further object of the invention is to provide an improved brake shoe applying unit for emergency braking purposes which in no way interferes with, or opposes, the application of the shoes of a brake system by their service brake applying apparatus.

Another object of the invention is to apply a brake shoe applying unit of this kind which is adapted to be readily combined with service brake systems of conventional constructions with but slight alteration of the latter and without requiring complete reconstruction, redesign or reorganization of the parts thereof.

Additional objects of the invention are to provide substantially completely independent and separate brake shoe applying units, each of which is independently operable by the respective control apparatus of the service and emergency of braking systems of a vehicle; to provide emergency brake applying apparatus having a comparatively large mechanical advantage which is compact and adapted to be accommodated in relatively small spaces closely associated with the wheel brake structure of a vehicle; to provide in mechanically operable emergency brake applying apparatus of this character improved means for enclosing the parts of the emergency brake applying apparatus and protecting the latter from road dirt and dust; and to provide adjusting mechanism for the emergency brake applying apparatus which is wholly independent of the service brake applying means.

An illustrative embodiment of the invention is shown in the accompanying drawings, in which:

Fig. 1 is a diagrammatic plan view of a vehicle chassis illustrating a combined emergency and service brake system embodying the invention.

Fig. 2 is an enlarged longitudinal vertical sectional view taken on the line 2—2 of Fig. 1.

Fig. 3 is a longitudinal, horizontal sectional view taken on the line 3—3 of Fig. 2.

Fig. 4 is a fragmentary transverse, vertical, sectional view taken on the line 4—4 of Fig. 2.

Fig. 5 is a fragmentary rear side elevational view, partly in section, of the wheel brake supporting assembly shown in Fig. 2 and illustrating an emergency brake adaptation embodying the invention.

In the drawings is illustrated a combined hydraulic service brake and mechanically operable emergency brake system, the latter being particularly adapted, by reason of the construction and arrangement of the parts thereof, to be used in combination with conventional mechanical service brake operating mechanism (not shown). The hydraulic service brake system, generally illustrated in Fig. 1, includes a master cylinder 10 having a fluid pressure medium outlet connected by pipes 11 and 12 with wheel brake cylinders 13 of front and rear wheel brake assemblies 14 and 15 respectively. The rear wheel brake assemblies 15, illustrated in Fig. 2, differ from the front wheel brake assemblies 14 only in that the latter are not provided with the emergency brake applying apparatus. If desired, however, the front and rear wheel brake units 14 and 15 may both be provided with emergency braking means in order to facilitate four wheel emergency braking operations.

Each rear wheel braking assembly 15 includes a supporting plate 16 mounted rigidly on the axle housing 17 of the vehicle and provided with an outwardly extending peripheral flange 18. A pair of brake shoes 19 are pivotally mounted at their lower extremities on the supporting plate 16 by pins 20. Each shoe 19 is provided with a brake lining element 21 that is adapted to frictionally engage the brake drum 22 of an associated wheel. Formed on the upper end portions of the brake shoe 19 are fingers 23' which extend into opposite ends of the wheel brake cylinder 13. The wheel brake cylinders illustrated in Fig. 2 are of the step cylinder type and they include telescoping sections 23 and 24 of different diameters, the section 23 of smaller diameter being associated with the forward brake shoe and the section 24 of larger diameter being associated with a rearward brake shoe in order to compensate for the self-energizing braking action of the forward brake shoe during normal brake applications as the car is moving forwardly. The fingers 23' of the brake shoe 19 which extend into the small and large end portions of the cylinder 13 are engaged by pistons 25 and 26 respectively which operate within the cylinder 13. The pistons 25 and 26 are normally urged outwardly by a coil spring 27 bearing therebetween and confined in the cylinder 13. The outer ends of the cylinder 13 are sealed against the admission of water, dirt and dust by rubber boots 28 having slots 29 therein through which fingers 23' project. The boots 28 have beads on their inner ends engaged in corresponding grooves in the fingers 23' and their outer ends are releasably engaged over outwardly extending flanges on the extremities of the cylinder 13 as illustrated in Fig. 2 of the drawings. A tension coil spring 30 having end portions releasably engaged in apertures 31 formed in the brake shoes 19 normally overpowers the spring 27 and resiliently holds the brake shoes in inoperative position.

During service brake operations, compression of the brake pedal 32 results in the displacement of fluid medium from the master cylinder 10 and the application of fluid pressure in the interior of the cylinder 13 whereby the pistons 25 and 26 are moved outwardly. Outward movement of the pistons 25 and 26 produces a corresponding outward pivotal movement of the brake shoes 19 about their respective axes 20 and forces the lining material 21 into frictional engagement with the brake drum 22. In this manner the brake shoes of all the four wheels of the vehicle are simultaneously applied. When the brake pedal 32 is released, the springs 30 of each wheel braking assembly return the brake shoes thereof to their normal inoperative positions and force the pistons inwardly against the action of the springs 27 in the cylinder.

The brake shoes 19 may also be applied by mechanical emergency brake applying apparatus which includes an emergency brake lever 33 constructed and arranged to rotate a shaft 34 extending transversely of the vehicle chassis, as illustrated in Fig. 1, and having lever arms 35 on its respectively opposite extremity. The levers 35 are operatively connected by links 36, which may comprise flexible cables, with emergency brake shoe applying means associated with each wheel brake unit. The emergency brake applying means of each wheel brake unit includes a pair of levers 37 and 38 which extend horizontally through slots 39 formed in the supporting disc 16 and which project into the interior of the brake drum 22 of the associated wheel. The inner ends of the levers 37 and 38 are pivotally connected together by a spreader link 40 and the outer end portion of these links are resiliently urged together by a tension coil spring 41 having its respectively opposite end portions releasably engaged in apertures 42 of the respective links.

Mounted on the external side of the supporting plate 16 is a sheet metal bracket 43 of channel shape having a longitudinally extending central slot 44 in the side thereof adjacent the support 16. The slot 44 of this bracket registers with the openings 39 of the supporting disc 16 and accommodates the passage of the levers 37 and 38 therethrough. Integrally formed on the end portions of the channel shaped metal bracket 43 are U-shaped straps 45 which extend over the open side of the channeled bracket, as illustrated in Fig. 3, providing sockets 46 in which cylindrical members are receivable. An internally threaded bushing 47 is disposed within the U-shaped strap 45 of the right end of the bracket 43, as illustrated in Fig. 3, and firmly clamped therein by a bolt 48 which extends through registering openings in opposite side portions of the strap. Formed in the outer periphery of the threaded bushing 47 is a circumferential groove 49 through which the shank of the bolt 48 extends in order to hold the bushing against axial displacement from the straps. The outer end portion of the bushing 47 is provided with a bolt head 50 by which the bushing may be held against rotation relative to the strap 45 in which it is disposed during adjusting operations hereinafter set forth. A threaded stem 51 is adjustably threaded in the bushing 47 and provided with a nut 52 by which it may be releasably locked in an adjusted position. The inner end portion of the stem 51 is provided with a pivot 53 which is pivotally attached to the lever 38 in such a manner as to support the latter.

The U-shaped strap 45 of the left end portion of the socket 43, as viewed in Fig. 3, provides a socket for receiving a cylindrical member 46' of the same size as the threaded bushing 47 and it is also equipped with a clamping bolt 48' by which such cylindrical member may be securely held in fixed relation to the bracket 43. The left end U-shaped member 45 shown in Fig. 3 is utilized in the embodiment of the invention shown herein for the purpose of rigidly clamping the tubular portion 46' of the flexible shaft 36 to the bracket 43 and support 16. The cylindrical member 46' may comprise a fixture on the tubular part of the flexible cable 36 and it is preferably provided with an external circumferential groove 54 into which the shank of the bolt 48' extends in order to hold the part 36 of the flexible shaft against axial displacement.

A yoke shaped coupling element 54' is rigidly attached to the end of the inner element flexible cable 36 and provided with a transverse cross pin 55 which is releasably engaged in a notch 56 formed in the upper end portion of the lever 37 in order to turn the lever 37 in a counterclockwise direction, as viewed in Fig. 3, when the cable 36 is pulled upon by the emergency brake control mechanism. Similar rotative movement of the lever 37 in response to application of the service brake apparatus is accommodated without moving the flexible cable 36 or subjecting the latter to compressive stresses by movement of the pin 55 in the notch 56.

Pivotally mounted at 70 on the intermediate parts of the levers 37 and 38 are U-shaped connecting fixtures 71, each of which has a slot 72 formed in its bent end for receiving an inwardly extending web 73 of one of the brake shoes 19 respectively. The fixtures 71 transmit emergency brake applying forces from the levers 37 and 38 to the brake shoes 19 when the cable is tensioned.

The external ends of the levers 37 and 38, as well as the operating cable 37 and associated parts of the operating mechanism and the adjustable bolt respectively, are enclosed within covers or caps 57 comprising sheet metal. Each cap 57 is of channel shaped cross section and has spaced side portions 58 between which the side walls of the channel shaped bracket 43 are receivable. The side walls 58 of the caps 57 have apertures therein for accommodating the same clamping bolts 48 and 48' which extend through the side walls of the caps as well as the straps 45 and 46 of the respective ends of the bracket 43. Formed on the adjacent inner ends of the caps 57 are downwardly extending flanges 60, as viewed in Fig. 3, which form end closures and which have a lip 64 releasably engageable under upwardly offset edge portions of a securing plate 65 that is rigidly fixed on the supporting plate 16 of the brake structure by a rivet 66, as illustrated in Fig. 3. The caps 57 are readily removable and substantially identical in construction and capable of reversal in position.

By virtue of the above construction there is provided a simple and inexpensive combined emergency and service brake unit comprising parts of identical construction for left and right wheel application and which are reversable in position with respect to front and rear, and left and right hand application in the braking apparatus.

Although but one specific embodiment of the invention is herein shown and described, it will be understood that various changes in the size, shape, and arrangement of parts may be made without departing from the spirit of my invention, and it is not my intention to limit its scope other than by the terms of the appended claims.

We claim:

1. In wheel brake mechanism comprising a support having brake shoes provided thereon and having an associated brake drum, means for applying said brake shoes to said drum including a bracket mounted on said support, a pair of levers extending into said drum, each being in pressure applying relationship with one of said brake shoes respectively, a link interconnecting the internal ends of said levers, an actuating member operatively connected with the outer end of one of said levers and associated with one end portion of said bracket, and means on the opposite end portion of said bracket for receiving the reaction of the force applied by said actuating member.

2. In wheel brake mechanism comprising a support having brake shoes provided thereon and having an associated brake drum, means for applying said brake shoes to said drum including a bracket mounted on said support, a pair of levers extending into said drum, each being in pressure applying relationship with one of said brake shoes respectively, a link interconnecting the internal ends of said levers, an actuating member operatively connected with the outer end of one of said levers and associated with one end portion of said bracket, and means on the opposite end portion of said bracket for receiving the reaction of the force applied by said actuating member, said reaction receiving means being adjustably mounted on said bracket for predetermining the position of the brake shoe applying means.

3. In wheel brake mechanism comprising a support having brake shoes provided thereon and having an associated brake drum, means for applying said brake shoes to said drum including a bracket mounted on said support, a pair of levers extending into said drum, each being in pressure applying relationship with one of said brake shoes respectively, a link interconnecting the internal ends of said levers, an actuating member operatively connected with the outer end of one of said levers and associated with one end portion of said bracket, and means on the opposite end portion of said bracket for receiving the reaction of the force applied by said actuating member, said bracket and the actuating member and reaction receiving means mounted thereon being so constructed and arranged as to accommodate reversal in the position of the extremities of said brake shoe applying means and universal application thereof to right and left wheel brake mechanisms respectively.

4. In wheel brake mechanism comprising a support having brake shoes pivoted thereon and an associated brake drum, a bracket on said support having a fixture on each of its opposite end portions, a pair of levers each extending into said drum, means pivotally attaching an intermediate portion of one of said levers in force applying relation to one of said brake shoes, means pivotally supporting the other lever from its outer end with an intermediate portion thereof in force applying relationship with the other brake shoe, a link connecting the inner end portions of said levers, an actuating member mounted on one of the fixtures of said bracket and coacting with the lever which is pivoted to said brake shoe, and means adjustably threaded in the other fixture for receiving the reaction of the force of said actuating means.

5. In wheel brake mechanism comprising a support having brake shoes provided thereon and an associated brake drum, a bracket on said support having a fixture on each of its opposite end portions, a pair of levers each extending into said drum, means pivotally attaching an intermediate portion of one of said levers in force applying relation to one of said brake shoes, means pivotally supporting the other lever from its outer end with an intermediate portion thereof in force applying relationship with the other brake shoe, a link connecting the inner end portions of said levers, an actuating member mounted on one of the fixtures of said bracket and coacting with the lever which is pivoted to said brake shoe, and means adjustably threaded in the other fixture for receiving the reaction of the force of said actuating means, said levers being so constructed and arranged as to apply substantially equal force on said shoes.

6. In wheel brake mechanism comprising a support having brake shoes operatively mounted thereon and apparatus for normally applying said shoes during service braking operations; means for applying said shoes independently of said normal applying apparatus including a bracket mainly symmetrical with respect to its vertical transverse central plane universally securable to brake mechanism supports of both right and left hand front and rear vehicle wheels, respectively, a system of levers adapted to be biased between said shoes during application of shoes by said means, and means on said bracket coacting with said levers for bringing said levers into operative positions, said levers and said means cooperating therewith being universally applicable to right and left hand vehicle wheel braking mechanisms respectively.

7. In wheel brake mechanism comprising a support adjacent a brake drum and having brake shoes and normal brake shoe applying apparatus operatively mounted thereon, means for applying said brake shoes independently of said normal brake shoe applying apparatus comprising a unitary structure universally appliable to right and left hand wheel braking mechanisms and including a system of levers adapted to be biased between said shoes, means adjustably fixing one of said levers to said support, and a control member connected with another lever of said system.

8. In wheel brake mechanism comprising a support adjacent a brake drum and having brake shoes and normal brake shoe applying apparatus operatively mounted thereon, means for applying said brake shoes independently of said normal brake shoe applying apparatus comprising a unitary structure universally appliable to right and left hand wheel braking mechanisms and including a system of levers extending into an end of said drum and adapted to be biased between said shoes for applying the latter, a pair of levers of said system having end portions extending externally of said drum, a bracket mounted on the external side of said support having a pair of fixtures thereon one associated with each of the external end portions of said levers respectively, means on one of said fixtures for adjustably anchoring one of the external ends of said levers thereto, and means extending from the other fixture and secured to the external end of the other lever for actuating said system of levers to apply said brakes.

9. In wheel brake mechanism comprising a support adjacent a brake drum and having brake shoes and normal brake shoe applying apparatus operatively mounted thereon, means for applying said brake shoes independently of said normal brake shoe applying apparatus comprising a unitary structure universally appliable to right and left hand wheel braking mechanisms and including a system of levers extending into an end of said drum and adapted to be biased between said shoes for applying the latter, a pair of levers of said system having end portions extending externally of said drum, a bracket mounted on the external side of said support having a pair of fixtures thereon one associated with each of the external end portions of said levers respectively, means on one of said fixtures for adjustably anchoring one of the external ends of said levers thereto, means extending from the other fixture and secured to the external end of the other lever for actuating said system of levers to apply said brakes, and means coacting between said externally extending levers for urging the latter toward inoperative positions.

10. In wheel brake mechanism comprising a support adjacent a brake drum and having brake shoes and normal brake shoe applying apparatus operatively mounted thereon, means for applying said brake shoes independently of said normal brake shoe applying apparatus comprising a unitary structure universally appliable to right and left hand wheel braking mechanisms and including a system of levers extending into an end of said drum and adapted to be biased between said shoes for applying the latter, a pair of levers of said system having end portions extending externally of said drum, a bracket mounted on the external side of said support having a pair of fixtures thereon one associated with each of the external end portions of said levers respectively, means on one of said fixtures for adjustably anchoring one of the external ends of said levers thereto, and means extending from the other fixture and secured to the external end of the other lever for actuating said system of levers to apply said brakes, said bracket being reversible end for end for reversing the positions of said anchoring and actuating means to accommodate universal installation of said unitary structure.

EDWIN R. MAURER.
ROBERT SMITH.